(12) United States Patent
Melzer

(10) Patent No.: US 7,418,669 B2
(45) Date of Patent: Aug. 26, 2008

(54) METHOD FOR CONTROLLING A WINDOW-BASED USER INTERFACE AND AN HMI DEVICE FOR CARRYING OUT SAID METHOD

(75) Inventor: Roland Melzer, Nuremberg (DE)

(73) Assignee: Siemens Aktiengesellschaft, Munich (DE)

(*) Notice: Subject to any disclaimer, the term of this patent is extended or adjusted under 35 U.S.C. 154(b) by 568 days.

(21) Appl. No.: 10/901,327

(22) Filed: Jul. 29, 2004

(65) Prior Publication Data

US 2005/0055646 A1 Mar. 10, 2005

Related U.S. Application Data

(63) Continuation of application No. PCT/DE03/00110, filed on Jan. 16, 2003.

(30) Foreign Application Priority Data

Jan. 29, 2002 (DE) .............................. 102 03 370

(51) Int. Cl.
G06F 15/00 (2006.01)
G06F 13/00 (2006.01)
(52) U.S. Cl. ...................... 715/798; 715/792
(58) Field of Classification Search ......... 715/792–798, 715/803, 788, 804, 863, 768
See application file for complete search history.

(56) References Cited

U.S. PATENT DOCUMENTS 5,546,521 A 8/1996 Martinez

| 5,712,995 | A | * | 1/1998 | Cohn | 715/792 |
| 5,796,402 | A | * | 8/1998 | Ellison-Taylor | 715/792 |
| 5,819,055 | A | * | 10/1998 | MacLean et al. | 715/798 |

FOREIGN PATENT DOCUMENTS

DE 37 07 490 A1 9/1988
EP 0 798 627 A1 10/1997

OTHER PUBLICATIONS

Hans-Jochen Schneider, Lexikon der Informatik und Datenverarbeitung, 1991, p. 303, vol. 3, R. OldenbourgVerlag, Munich, Germany.
Automatic Window Management Mode, IBM Techical Disclosure Bulletin, Sep. 1, 1992, pp. 331-332, vol. 35 No. 4B, IBM Corporation, New York, US.
Proximity Detector for Mouse Cursor, IBM Technical Disclosure Bulletin, Jan. 1991, pp. 253-254, vol. 33 No. 8, IBM Corporation, New York, US.
Focus Ratio for Windows, IBM Technical Disclosure Bulletin, Sep. 1, 1992, pp. 62-63, vol. 35 No. 4B, IBM Corporation, New York, US.

* cited by examiner

*Primary Examiner*—Cao Kevin Nguyen
(74) *Attorney, Agent, or Firm*—Sughrue Mion, PLLC

(57) ABSTRACT

A control of a window-based interactive user interface (210) includes at least two overlapping display and control windows (220, 230). When one display and control window (220) is activated, the other display and control window (230) is automatically reduced in size to such an extent that it is represented in its entirety on the interactive user interface (210) without overlapping the display and control window (220). The activation of the display and control window (220) is preferably triggered by an optical cursor (211).

14 Claims, 3 Drawing Sheets

METHOD FOR CONTROLLING A WINDOW-BASED USER INTERFACE AND AN HMI DEVICE FOR CARRYING OUT SAID METHOD

This is a Continuation of International Application PCT/DE03/00110, with an international filing date of Jan. 16, 2003, which was published under PCT Article 21(2) in German, and the disclosure of which is incorporated into this application by reference.

BACKGROUND OF THE INVENTION

1. Field of the Invention

The present invention relates to a method for controlling an interactive window-based user interface with at least two overlapping display and control windows.

2. Description of the Related Art

In the operation of computer systems, the window technique has gained wide popularity. The following definition of a window is given in Lexikon der Informatik und Datenverarbeitung [Dictionary of Information Systems and Data Processing], $3^{rd}$ edition, R. Oldenbourg Verlag [Publishers], Munich, 1991, page 303: "A usually rectangular area on the display screen of a data terminal which can be regarded as an independent (virtual) display. With the help of windows various information units can be displayed and manipulated selectively at the same time."

One problem that occurs repeatedly in practice is when several windows are displayed on the user interface of a computer monitor and partially overlap. There is thus a virtual stratification of windows arranged more or less one on top of the other. Only the contents of the window on top, i.e., the currently active window, are completely visible and accessible for operating control objects contained in that window, for example. The windows behind that window more or less, i.e., the windows not currently active, are partially or even completely covered by the active window and thus are at least not completely visible.

When using a computer system in an office environment, this problem is usually solved by the fact that the respective operator switches constantly between the opened windows displayed on the user interface. However, when a computer system is used in an industrial environment for observing and influencing industrial technical equipment, complete or partial coverage of the contents of the display of windows may be problematical, e.g., for safety reasons.

Technical equipment may be controlled and operated with the help of digital programmable devices, which may frequently also constitute an automation system and/or be part of such a system. Technical equipment is understood to refer to all types of technical devices and systems in an individual arrangement as well as in an arrangement in which a field bus, for example, provides technical data networking. Thus, technical equipment is understood to include individual production facilities as part of an industrial application, e.g., drives, machining equipment, etc. However, an entire production plant may also be regarded as technical equipment. Under some circumstances, an entire technical process, e.g., in a chemical plant, a manufacturing plant or a processing plant will be carried out with locally distributed production facilities. The scope of functions of programmable devices used for managing technical equipment is constantly increasing. In addition to decentralization of production facilities of such a device and their networking via bus systems, operability of the devices is becoming increasingly important. Distributed automation systems in particular may have special devices which form the interface between a user and the automation system.

Such devices are generally known as human machine interface (HMI) devices. In addition, it has become customary to refer to this class equipment as devices for "operator control and monitoring" of technical equipment, abbreviated as "control and monitoring devices." These devices which are more or less upstream from the actual devices for direct control of technical equipment have an increasing functionality. A survey of the scope of function of HMI devices can be obtained, for example, by inspecting Internet displays of Siemens A G, Automation and Drives Division at http://www.ad.siemens.de/simatic/html_76/intro/hmi.htm or http://www.ad.siemens.de/hmi/html_00/index.htm. Furthermore, by activation of a conventional Internet search machine such as GOOGLE at the address http://www.google.de, an abundance of product instructions for HMI devices and systems can be found by entering a search query such as "human-machine interface." The term HMI device is to be understood as an umbrella term including all components belonging to this group of devices, e.g., operator panels, frequently also abbreviated as OP.HMI devices have an increasing functionality and assume functions (e.g., in a networked automation system) which can generally be regarded as preprocessing and post-processing of data of the technical facility to be controlled. This does not just relieve the load on a central control unit, e.g., a programmable controller. Instead, an HMI device may permit functions which improve the user-friendliness, quality and safety of an operation by an operator, e.g., providing an overview of the equipment to be operated and error-free operations.

Thus an HMI device generates at least an interactive overview display or process image of the technical equipment to be operated. This permits first a pre-selection of operator actions to convert the equipment to the desired state. On the other hand, however, targeted display of reactions of the technical equipment is also possible, usually in the form of measured values and messages. This permits reliable observation of the status of the technical installation. Trouble messages which signal an unwanted state of the equipment and usually result in targeted input of operator actions by an operator into the HMI device assume a special position. With these, the trouble incident in the technical equipment which has generated the trouble message is to be influenced in such a way that the technical equipment is returned to a desired state again as soon as possible.

In a window-based user interface, problems may thus occur due to the fact that important window contents are concealed by currently active windows. For example, if a window in an HMI device contains an important trouble message of technical equipment, problems may occur due to the fact that this window is covered at least temporarily by another active window. For example, a person may perform a normal operating action, e.g., adapted to the setpoint for a process parameter.

German Patent DE 37 07 490 describes an arrangement for simultaneously displaying several images on the display screen of a monitor. An operator element is provided here so that the size and position of the images on the screen are adjustable. To this end, a window adjustment mark is displayed on the boundary lines of adjacent windows and is displaceable by the operator, with the boundary lines also being shifted. The detail displayed in a window can thus be adjusted manually in this way.

SUMMARY OF THE INVENTION

One object of the present invention is to provide a method for controlling a window-based user interface and an HMI device operated according to this method with which the problems described in the related art above can be avoided. Another object of the invention is to create a corresponding automation system and a respective computer program product embodied on a computer readable memory.

According to one formulation of the invention, with the inactivation of the one display and control window, the other display and control window automatically reduces in size to such an extent that it is displayed completely on the interactive user interface without overlapping with the one display and control window. It is thus possible for one operator to logically at least acquire the display and control window so that critical contents such as alarm messages, which under some circumstances require immediate initiation of suitable measures, can be recognized promptly.

Depending on the application, it may be advantageous in the above case if the other display and control window is automatically reduced to the size of an icon, i.e., a symbol representing the display and control window in question. Here again, currently critical contents of the iconized window triggered, for example, by trouble messages of a technical installation, can be made identifiable by a corresponding design of the icon. This embodiment of the invention is particularly advantageous when the window-based user interface must be displayed on a small area display unit, e.g., on an LCD display of a handheld unit.

Activation of a display and control window may be advantageously triggered by an optical cursor, which can be manipulated by an operator, e.g., using an operating device such as a mouse. If the optical cursor is brought into the vicinity of a display and control window or is passed over it, for example, then this is automatically reduced to a size that can still be displayed or to the size of an icon according to this invention.

In iconizing a display and control window in particular, it is advantageous if a text is displayed on the user interface in proximity to the optical cursor. The text here contains selectable parts of the reduced display and control window. For example, if the reduced window contains a trouble message, the text may refer to the content of the current problem. The text is advantageously output when the optical cursor is in proximity to the reduced (e.g., iconized) other display and control window on the user interface. Thus, the reference in the text at the optical cursor to the respective reduced display and control window can be illustrated for an operator.

It is particularly advantageous if an HMI device which is used for operating and control of technical equipment is operated according to the inventive method. The advantage is manifested in particular when the HMI device is designed as a handheld device and/or as an operator panel, because such devices are usually equipped with only relatively small display units such as touch screens or LCD displays. This invention may also be implemented in an automation system which acts on technical equipment and to which the at least one HMI device is connected or into which it is integrated.

If this invention is executed by a computer program, it is advantageously embodied in the form of a computer program product. These are conventional manifestations of the computer program, which has software means for implementing an inventive method when the computer program is executed in an HMI device or an automation system. This may involve recording on conventional data media such as diskettes, CDs, DVDs, hard drives, memory sticks, tapes, etc. However, data files that are stored in a computer server and can be downloaded via the Internet, for example, and loaded into an HMI device or an automation system also constitute computer program products in the sense of this invention.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF EMBODIMENTS OF THE INVENTION

Figure 1:
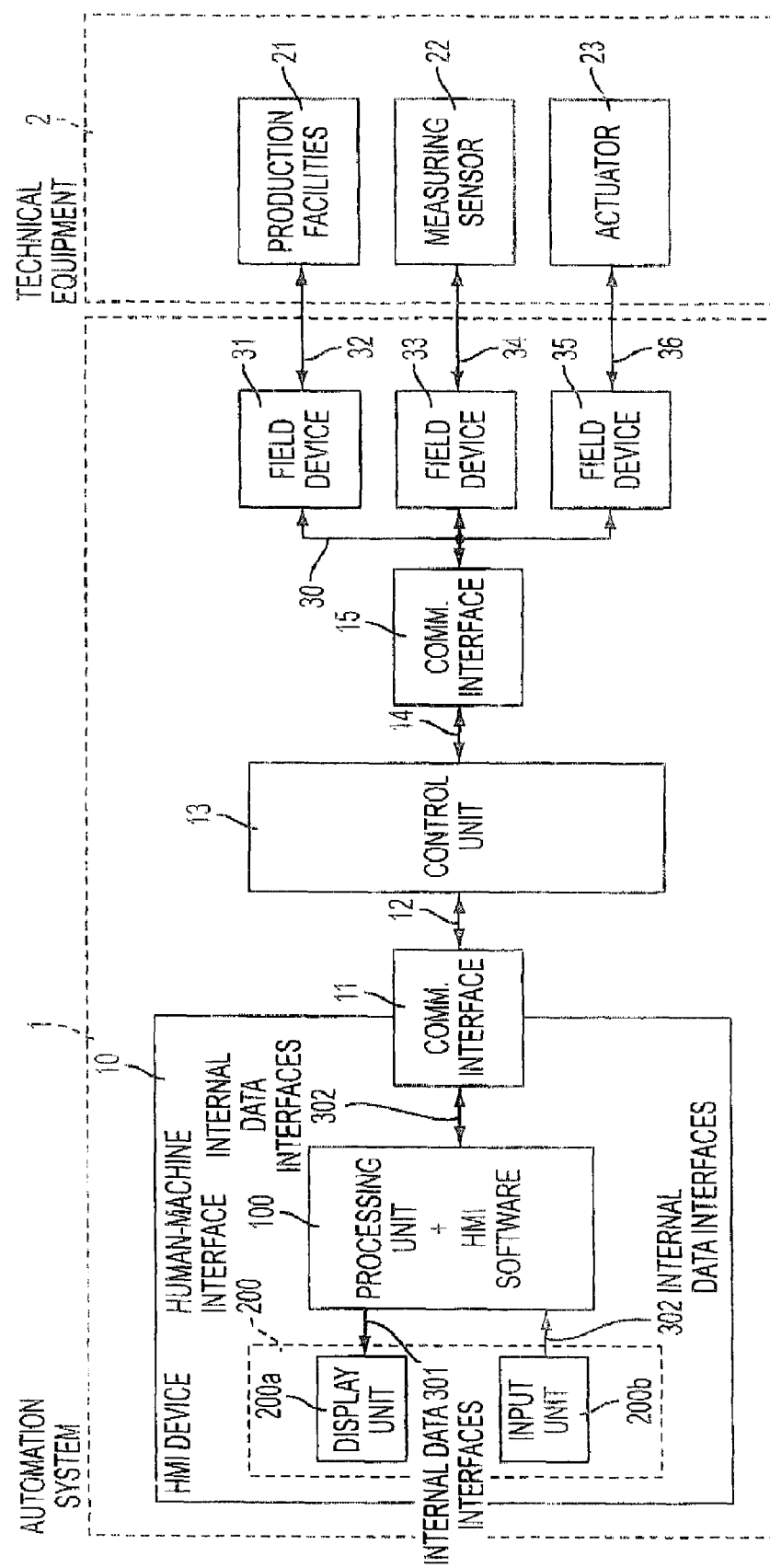
FIG. 1 shows a block diagram of an exemplary embodiment of an automation system having an HMI device for operating technical equipment.

FIG. 1 shows a block diagram of an exemplary embodiment of an automation system 1 which has an inventive HMI device 10 for operation of technical equipment 2. The HMI device has a human-machine interface 200 which has a display unit 200a, e.g., an LCD display, an input unit 200b, e.g., a film keyboard, key fields, mouse pads, etc. The display unit and input unit may also be designed as a combination device, e.g., in the form of a touch-sensitive display unit, e.g., a touch screen.

The HMI device 10 also has a processing unit 100 on which HMI software runs. The HMI software is used first for triggering display unit 200a and input unit 200b of the human-machine interface 200, whereby the display and input units 200a, 200b are connected to the processing unit 100 via internal data interfaces 301, 302. In addition, the HMI software has the function of performing user-specific preprocessing and post-processing in particular of operator actions, measured value displays and messages of trouble incidents.

A few of the many functions of a computer program of an HMI software type will be described here. For example, operator actions, measured values and trouble incidents can be entered by HMI software into an interactive process image and visualized on the display unit 200a. Furthermore, operator actions, measured values and trouble incidents, for example, can be documented in a user-specific manner and archived in suitable lists for later analyses. Furthermore, HMI software may have editors with which individually designed process images of the technical equipment 2 to be monitored and operated can be projected. HMI software may be, for example, the programs WinCC or UTAH from Siemens AG. Such HMI computer programs are executed in an HMI device or an automation system and are commercially available in the form of conventional computer program products such as program CDs, diskettes, program files downloadable over the Internet, etc.

In the embodiment depicted in FIG. 1, the HMI device 10 is connected to a control unit 13 via a communications interface 11 and an internal data bus 12. The control unit may be a programmable controller, which has the actual task of guiding the technical equipment 2. For example, control algorithms for technical production facilities of the technical equipment may be executed in the control unit 13. If the automation system 1 is used for process management, e.g., of technical production facilities in the chemical industry, then recipe administration, batch controls, etc. may run in the control unit 13.

In the example in FIG. 1, another communications interface 15 forms the transition between the internal data bus 14 at the output of control unit 13 and a field bus 30. For example, bus systems such as a field bus, Profibus, Ethernet, industrial Ethernet, FireWire or PC-internal bus systems (PCI), etc., are used as data networks which extend into the technical equipment 2 which under some circumstances may be widely distributed over space. This field bus establishes a technical data connection from field devices to the control unit 13 and also to the HMI device 10. Field devices are understood to refer to peripheral devices such as input/output modules, drives, actuators, sensors, regulator or control units of all types. For example, in the embodiment depicted in FIG. 1, a field device 31 is connected via an external data interface 32 to production facilities 21, e.g., a drive of the technical equipment 2. Accordingly, the field devices 33, 35 are connected to a measuring sensor 22 and/or an actuator 23 of the technical equipment 2 via the external data interfaces 34, 36.

Referring to FIGS. 2-5, the invention will now be explained using the example of an industrial controller which controls a technical facility or some other technical process, e.g., in the chemical industry. The technical equipment may be an automation system 1 into which is integrated at least one HMI device. This has a human-machine interface 200 which has at least one window-based interactive user interface, e.g., in the form of a touch screen.

Figure 2:
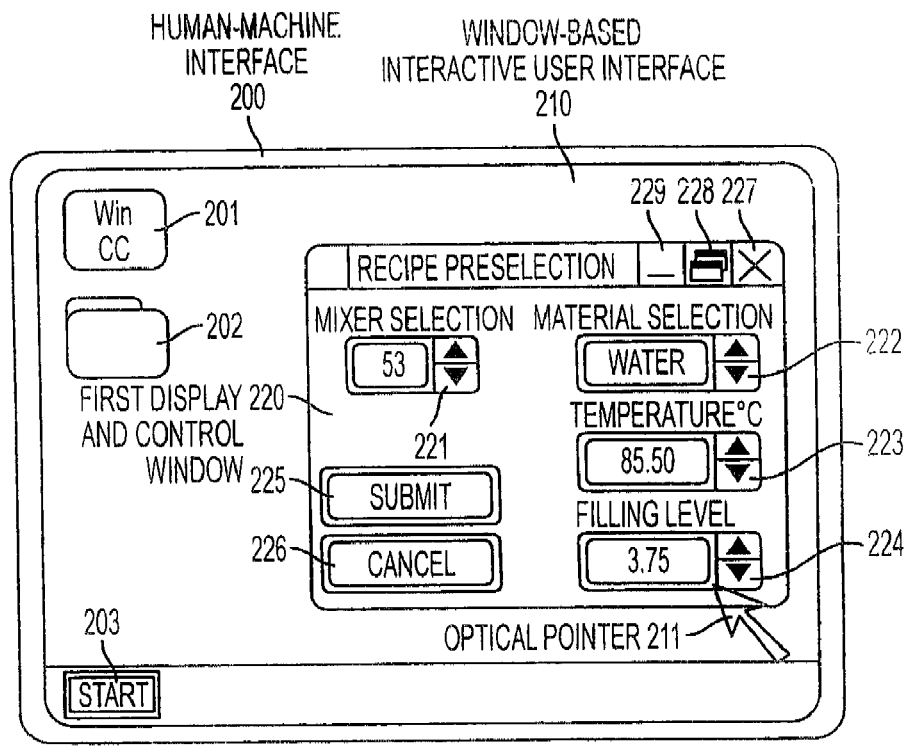
FIG. 2 shows a user interface which is output by a display device and on which a display and control window is output.

Thus, FIG. 2 shows as an example a human-machine interface 200 which may be an active operator terminal of the automation system 1. The user terminal may be in the form of an operator panel and/or a handheld, for example. For operation, these are usually equipped with an operating keyboard and a window-based interactive user interface to 210, e.g., an LCD monitor. Data, programs, messages can be displayed and controlled in a window-based manner via the user interface in the manner known to be associated with Windows-based PC computer systems. If the interactive window-based user interface 210 is implemented in the form of a touch screen, for example, direct operations can also be performed via this screen without requiring any additional keyboard.

In the example of FIG. 2, a first display and control window 220 is output as an example on the window-based interactive user interface 210. In this non-limiting example, a "recipe preselection" is used to preselect process parameters for a group of mixers in a chemical plant. The operation is advantageously performed by an optical pointer 211, e.g., an operating mark, i.e., a cursor, which can be navigated over the entire interactive user interface 210 by using an input device such as a mouse, for example. Via an operating field 221 for "mixer selection", it is possible to select the mixer for which the data to be preselected are determined. In this example, this is a mixer varying the number "53".

In the example of FIG. 2, the display and control window 220 permits a selection of substances via an operating field 222, for example, and permits a temperature preselection via an operating field 223 for the selected substance and a filling level preselection in cbm via an operating field 224 for the mixer "53" currently selected. In the example depicted here, it is stipulated that "water" as the substance is to be supplied to the activated mixer 53 in a filling quantity of "3.75 cbm" and a temperature of "85.50 C". The preselected values can be released by activation of the operating field 225 used for data input, i.e., transferred to an automation system 1 for execution. Otherwise the process can be terminated prematurely by operation of the operating field 226 which serves for termination of a data transfer.

The exemplary display and control window 220 also has on the lower edge a task bar 203 on which activatable programs and/or programs currently running can be displayed and/or operated in the form of small symbols known as icons. The icon 203 labeled as "start" in the example permits activation of a submenu containing a list of activatable user programs. Finally, two icons 201 and 202 are also displayed on the interactive user interface. The icon 201 represents a logic link to a program, e.g., WinCC, and the icon 202 links to a data file. By operation of icon 201, a program linked to it by the software can thus be initialized. In addition, the data file linked to the icon 202 can be opened by operation with the help of the optical cursor 211.

Finally, the display and control window 220 also has other operating fields with which operation of a general type can be performed. For example, the window "Recipe preselection" 220 can be closed with activation of the operating field 227. Activation of the operating field 229 permits minimization of the window, e.g., iconization, and a reduction to a display format corresponding to that of icons 201, 202. Conversely, activation of a full image mode is possible with the operating field 228. The display and control window 220 would then be enlarged so that it fills out the entire interactive user interface 210.

The display and control window 220 depicted in FIG. 2 is used here only as an example to illustrate the basic principle of how a display and preselection of process parameters take place in observation and control of technical equipment with the help of a window-based interactive user interface. The display and control windows of real process controls usually have a much larger number of different types of displays and operating fields in practice.

The case may now occur that, for example, on the basis of an incident in the technical process to be controlled or on the basis of a corresponding action by an operating person, another display and control window on the interactive user interface of an HMI device is automatically opened by the automation system. This is usually above the display and control window(s) already opened and covers it/them partially or almost completely.

Figure 3:
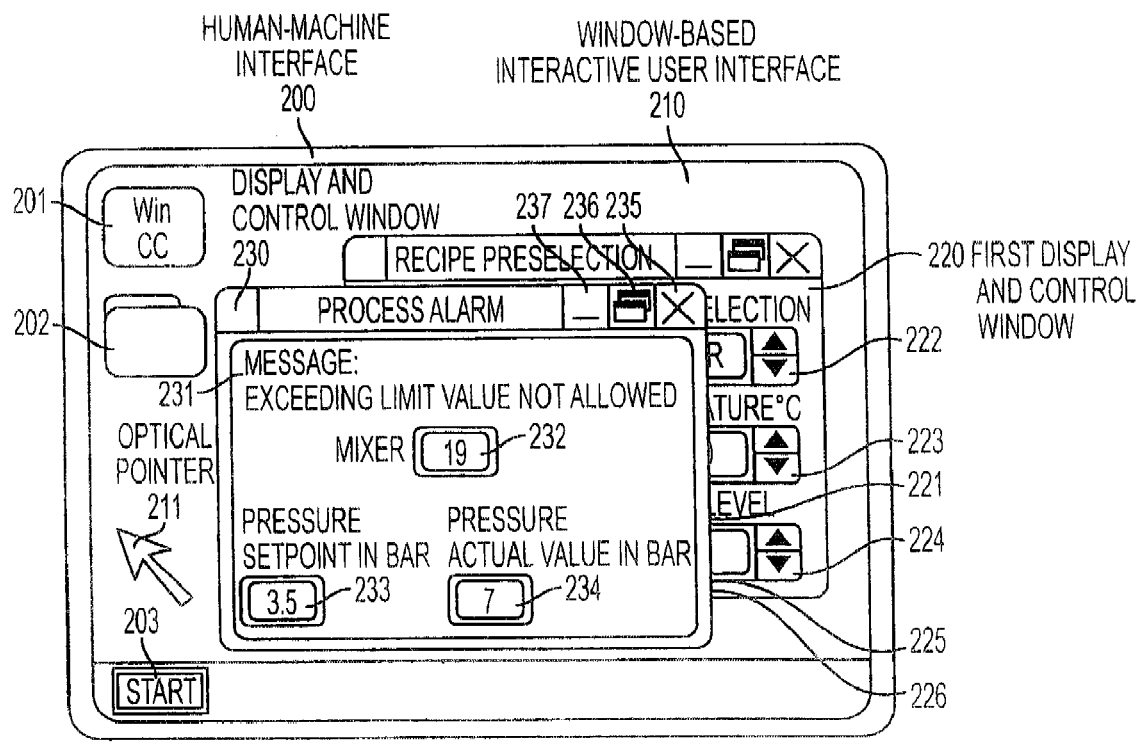
FIG. 3 shows the user interface from FIG. 2, in which another overlapping display and control window is output.

FIG. 3 shows such a case as an example. A second display and control window 230 which is labeled as "Process alarm" is displayed on the interactive user interface 210 and covers the display and control window 220 which was previously displayed exclusively. The second display and control window 230 has a message text 231 "Message: exceeding limit value not allowed," which in this example signals the onset of a problem. For example, there is a display field 232 for the production facility having a problem at the moment, in this example the mixer 19. In addition there is a display field 233 for the setpoint value of the process variables in which the disturbance is currently occurring, namely in this example a "pressure setpoint value in bar" on the order of 3.5. There is also a display field 234 for the actual value of the disturbed process variables, in this example an "actual pressure value in bar" on the order of 7.

Finally, the display and control window 230 also has operating fields with which operations of the general type can be performed. It is thus possible to close the window "Process alarm" 235 by activation of the operating field 237. Activation of the operating field 237 makes it possible to minimize, e.g, iconize the window, and reduce it to a display format corresponding to that of icons 201, 202. Conversely, activation of a full image mode is also possible with the operating field 236. The display and control window 230 would then be increased in size to the extent that it fills out the entire interactive user interface 210.

In practice, a state depicted in the example in FIG. 3 is disadvantageous and is frequently unwanted. The reason for this is that the display and control window 220 which has been active so far is at least covered by the new display and control window 230 to the extent that, for example, the operating fields 221, 225, 226 are completely covered and the operating fields 222, 223, 224 are substantially covered. The unwanted concealment is naturally especially apparent with small-area user interfaces 210 such as those with operator panels or hand-held operating units, for example. Even if the display and control window 230 is brought completely to display in the front level because of its urgent contents, ongoing operation of the display and control window 220 by the insertion of the window 230, which usually occurs suddenly, is interrupted abruptly. In many cases, an operator would like to continue operation of the display and control window 220 without delay after taking note of the current message contents of the window, in particular the message text 231 in the example in FIG. 3. So far this has required multiple operations, usually with the help of the optical cursor 211. The display and control windows on the interactive user interface 210 are in particular shifted and reduced in size so that there is little or no interfering coverage. Operations of this type occur constantly with user interfaces based on the Windows standard. They are usually noncritical with technical applications in the office field because the software applications in the display and control windows that are currently being covered are not real time capable, i.e., they do not require and/or induce any direct measurable or controllable interventions into a physical environment.

Control units used in process engineering, in particular automation systems and the computer program products processed by them are not off-line, however. Instead they are usually in an online connection to a technical process. An unforeseen delay even in simple operations such as preselection of a required filling level of process water for a mixer 53, for example, via the operating field 224 in the display and control window 220 in the example in FIG. 2 may have unwanted effects on the respective technical process.

This problem is addressed by the present invention through activation of the one display and control window, the other display and control window is automatically reduced in size to such an extent that it is displayed completely on the interactive user interface without overlapping with the one display and control window. Activation of the one display and control window with an optical cursor is preferably triggered.

Aspects and further embodiments of the invention are explained in greater detail below with reference to an example spanning various states illustrated in FIG. 4 and FIG. 5.

Figure 4:
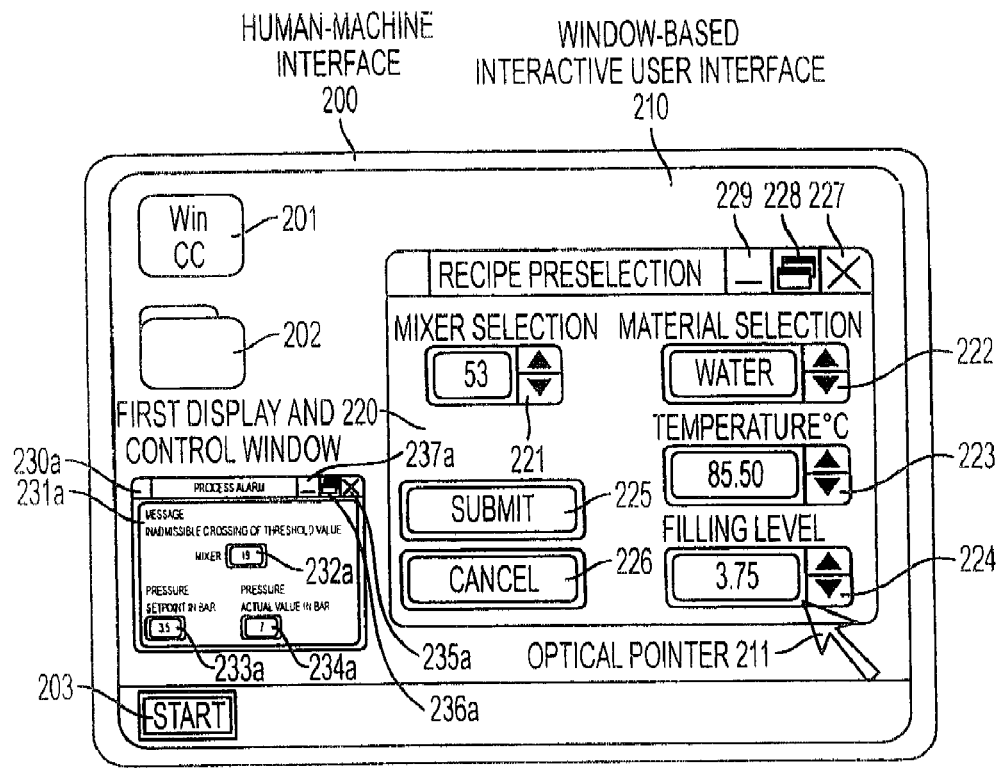
FIG. 4 shows the user interface from FIG. 3 in which one of the two display and control windows is reduced according to this invention so that it is still displayed completely.
Figure 5:
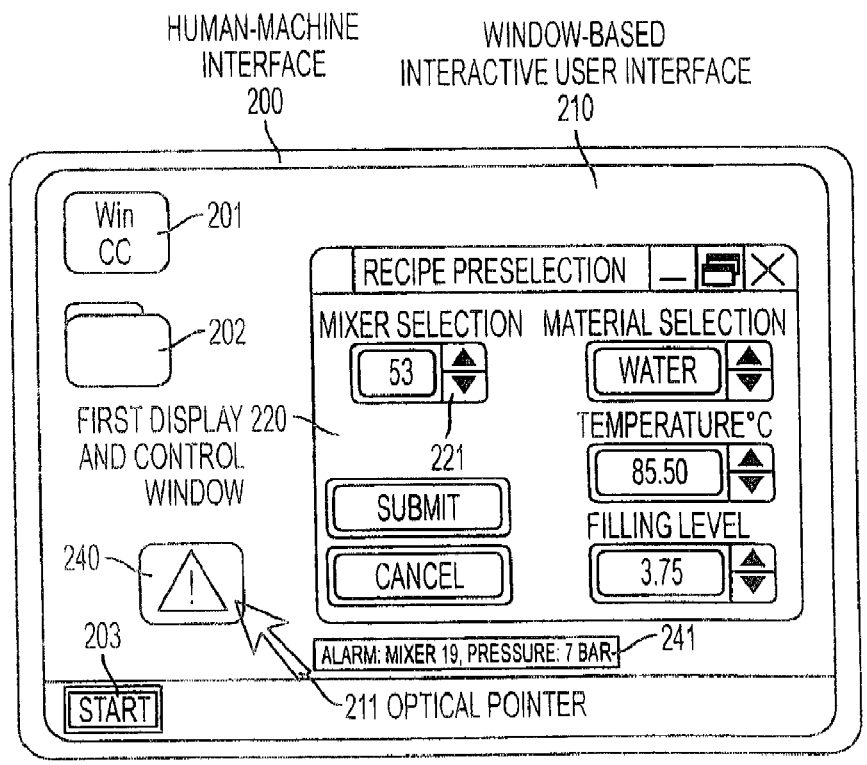
FIG. 5 shows the user interface from FIG. 3 in which one of the two display and control windows according to this invention has been reduced to the size of an icon.

On the basis of the state depicted in FIG. 3 in which the display and control window 230 is active, the display and control window 220 is activated in the example of FIG. 4. In this case the other display and control window 230 is automatically reduced in size to such an extent that it is displayed completely on the interactive user interface 210 without overlapping with the display and control window 220. The degree of the required reduction in size is thus performed dynamically by a processing unit, e.g., an HMI device or an automation system as a function of the available area of the interactive user interfaced 210, i.e., the area not yet occupied by another display and control window. Thus, in the example in FIG. 4, the display and control window with the title "Process alarm" is placed in a reduced form 230*a* on the free area to the left of the display and control window 220 and below the icon links 201, 202. All the elements 231 to 237 of the display and control window 230 in FIG. 3 are present accordingly in the form of the elements 231*a* to 237*a* in the reduced output 230*a* of FIG. 4. Furthermore, the display and control window 220 is again available in the full area and thus to an unlimited extent for operation.

Activation of the display and control window 220 is preferably triggered with an optical cursor 211. In the example of FIG. 3, this may be accomplished by the fact that an operating person shifts the optical cursor 211 on the interactive user interface 210 by operation of a mechanical input unit (not shown), e.g., a so-called computer mouse until it contacts the area of the mostly concealed display and control window 220. This may be used as a triggering moment for triggering the automatic size reduction of the display and control window 230 according to this invention.

The other display and control window 230 may advantageously also be reduced automatically to the size of an icon. In the example in FIG. 5 this is shown by the icon 240. This icon is designed, for example, as an alarm symbol with a "warning triangle" in order to symbolize the message function of the second display and control window 230 "Process alarm" linked to it. In another embodiment of this invention which has already been illustrated in the example of FIG. 5, a text field 241, which contains selectable portions from the display and control window 230 which is linked to it in the software, is displayed on the user interface 210 in spatial proximity to the optical cursor 211. The text "Alarm: mixer 19 pressure 7 bar" depicted in this example is generated by selection of the display fields 232 and/or 232*a* and 234 and/or 234*a*. The text field 241 is advantageously output here only when the optical cursor 211 on the user interface 210 is in spatial proximity to the iconized display and control window 230.

The above description of exemplary embodiments has been given by way of example. From the disclosure given, those skilled in the art will not only understand the present invention and its attendant advantages, but will also find apparent various changes and modifications to the structures and methods disclosed. It is sought, therefore, to cover all such changes and modifications as fall within the spirit and scope of the invention, as defined by the appended claims, and equivalents thereof.

What is claimed is:

1. A method for controlling a window-based interactive user interface having at least two display and control windows, comprising:
    activating a first of the display and control windows, and, upon activation,
    automatically reducing in size and displaying a second of the display and control windows on the interactive user interface, the second display and control window automatically reduced in size to such an extent that the second display and control window is completely displayed on the interactive user interface without overlapping with the first display and control window,
    wherein, upon activation of the first display and control window, the reduced second display and control window is shifted to a different portion of a display.

2. The method as claimed in claim 1, wherein the second display and control window is reduced to an icon-size and wherein an alarm in the non-active second window is displayed in an entire space occupied by the icon-size display of the second window.

3. The method as claimed in claim 1, wherein activation of the display and control windows is triggered using an optical cursor.

4. The method as claimed in claim 3, wherein the triggering of a selected one the display and control windows is conducted by guiding the optical cursor on the interactive user interface into spatial proximity with the selected display and control window.

5. The method as claimed in claim 1, wherein a text which contains selected information from a given one of the display and control windows is displayed on the operator surface in spatial proximity to an optical cursor.

6. The method as claimed in claim 5, wherein the text is displayed when the optical cursor is on the interactive user interface in spatial proximity to the given display and control window.

7. The method according to claim 1, wherein each window relate to one of the technical equipment and wherein the windows provide control and monitoring of an automation process in which the technical equipment is involved.

8. The method according to claim 7, wherein a window displays measured values and messages of trouble incidents of respective technical equipment.

9. The method according to claim 1, wherein a display for the windows is a display of a personal digital assistant device.

10. The method according to claim 1, wherein a display for the windows is a touch screen of an operation panel in a manufacturing plant.

11. A Human-Machine-Interface hardware device used for controlling and monitoring technical equipment, comprising:
 a window-based interactive user interface having at least two display and control windows; and
 a controller activating a first of the display and control windows, and, upon activation,
 automatically reducing in size and displaying a second of the display and control windows on the interactive user interface, the second display and control window automatically reduced in size to such an extent that the second display and control window is completely displayed on the interactive user interface without overlapping with the first display and control window,
 wherein changes in states are pre-selectable for the technical equipment for display in the first display and control window.

12. The Human-Machine-Interface hardware device as claimed in claim 11, wherein changes in states in the technical equipment can be displayed in the second display and control window.

13. The Human-Machine-Interface hardware device as claimed in claim 11, wherein the Human-Machine-Interface device is implemented as at least one of a handheld device and an operator panel.

14. A computer readable medium storing instructions which when executed, cause a Human-Machine-Interface device or automation system having a window-based interactive user interface including at least two display and control windows, to:
 activate a first of the display and control windows, and, upon activation,
 automatically reduce in size and display a second of the display and control windows on the interactive user interface, the second display and control window automatically reduced in size to such an extent that the second display and control window is completely displayed on the interactive user interface without overlapping with the first display and control window,
 wherein, upon activation of the first display and control window, the reduced second display and control window is shifted to a different portion of a display.

* * * * *